June 1, 1937.  L. A. PARADISE  2,082,258
PITMAN
Filed April 25, 1935
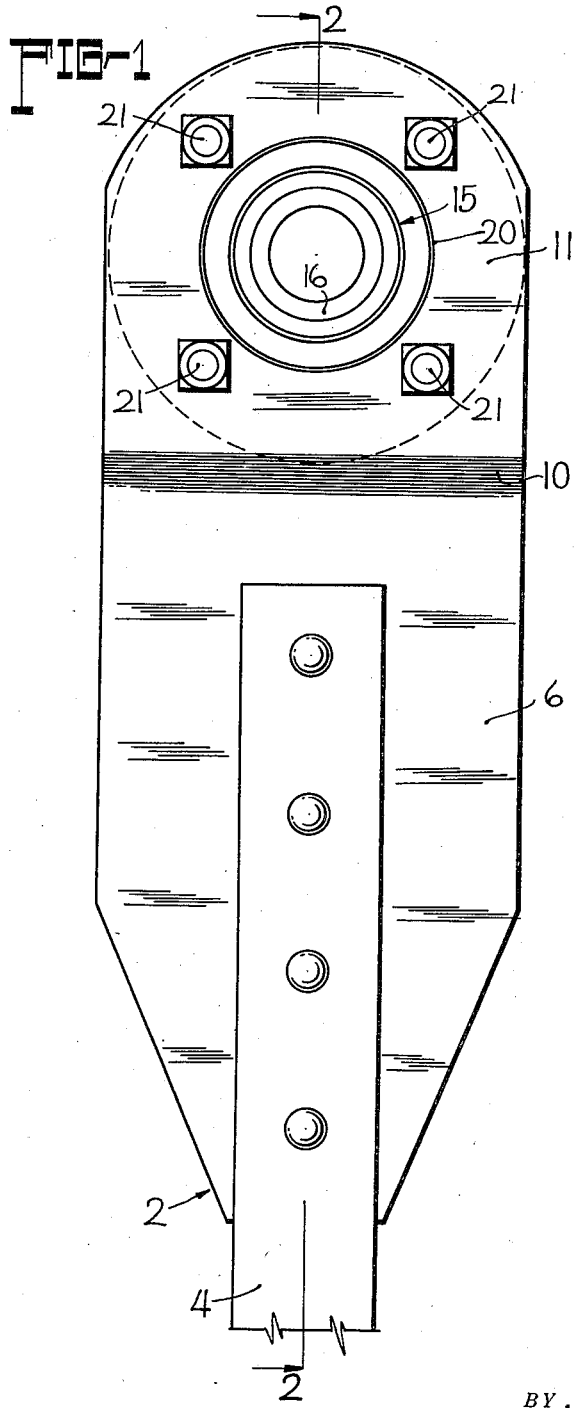
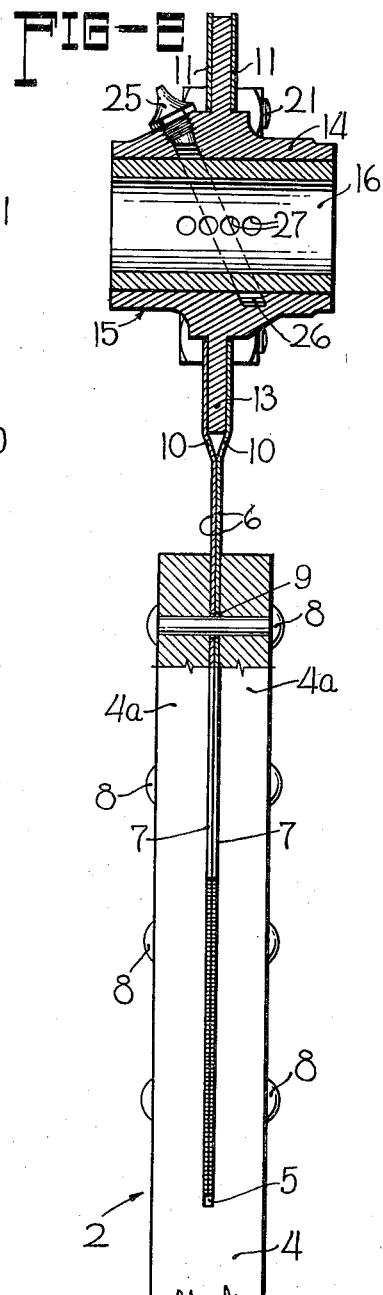
INVENTOR
Louis A. Paradise
BY Brown, Jackson, Boettcher & Dienner
ATTORNEYS.

Patented June 1, 1937

2,082,258

UNITED STATES PATENT OFFICE 2,082,258

PITMAN

Louis A. Paradise, Moline, Ill., assignor to Deere & Company, Moline, Ill., a corporation of Illinois Application April 25, 1935, Serial No. 18,088

10 Claims. (Cl. 74—579)

The present invention relates generally to pitmans and pitman connections for mowers, combines, harvesters and other agricultural implements and is principally concerned with the provision of a new and improved pitman in which the pitman bar is operatively connected with its driving member by sheet metal strap or plate members which, while providing for a certain amount of lateral flexibility and are so arranged as to accommodate parts that are out of alignment, form a pair of connecting members which reenforce each other against failure and breakage.

Heretofore, the pitmans of mowing machines, grain harvesters and the like, have been constructed with pivotal connections between the pitman bar and the crank wheel pin so as to accommodate crank pins which are not exactly perpendicular to the plane in which the pitman reciprocates, as when the crank pin is not positioned exactly at right angles to the fly wheel which carries it, resulting in the axis of the crank pin generating a conical surface instead of a true cylinder, or when the direction of movement of the sickle is not at right angles to the axis of rotation of the mower crank wheel or is out of line with the crank pin. As a result, the bearing is forced either to wobble slightly with respect to the pitman or the connection between the bearing and the pitman is deflected. However, because of the hammering effect of the force transmitted from the bearing to the pitman, these pivotal connections were a continuous source of trouble and failure and breakage are not an uncommon occurrence.

In order to provide a sturdier and longer lived connection, it has been proposed to provide a pitman having a single flat plate connecting the pitman bar and the bearing or driving member connected with the crank wheel of the machine having the requisite thickness and rigidity to transmit the longitudinal forces for reciprocating the pitman, but at the same time having sufficient flexibility to provide for necessary lateral movement to accommodate displaced crank pins, but it has been found that the single flat plate ultimately failed adjacent its point of attachment to the bearing member, due probably to the flexing of the plate and its tendency to bend further during transmission of compressive forces when so flexed.

In order, therefore, to provide a pitman construction having sufficient lateral flexibility but one in which the tendency for the connecting plate to fail in use is eliminated, the present invention contemplates a pitman connection employing two mutually reenforcing plates secured together between the ends of the pitman bar by means permitting some relative movement between the plates and, at the point where failure formerly occurred, having portions already bent but in opposed relation and diverging outwardly and terminating in spaced sections disposed on opposite sides of the bearing member. By virtue of this type of construction, a stronger and sturdier but lightweight pitman is provided and in which breakage does not occur as in the previous constructions, but in which a flexibility is secured which is equal to or exceeds that of the single plate member. It has also been found that when two plates are used in the manner suggested by the present invention, a lighter gauge of plate can be used than formerly. In fact, in the preferred construction, the combined thickness of the two plates is about equal to the thickness of the single plate heretofore used, and the connection is quite flexible to accommodate lateral movements yet equally rigid to transmit longitudinal forces, but the connection is not subject to breakage as is the single plate connection.

A further object of the present invention is the provision of a pitman construction employing two connecting plate members in which portions of the plates are in mutual contact and secured by rivets or the like within a slot formed in the pitman bar proper and in which the opposite end portions of the plates are spaced apart to receive the flange of a bearing member therebetween, the holes in the plates receiving the rivets being slightly larger than the rivets, whereby if there is any misalinement between the crank pin and the pitman such as would cause the pitman to operate with a slight bend in the plates, a gradual slippage between the latter can occur. This relieves some of the stresses in both plates and thereby alleviates the main cause of breakage.

These and other objects and advantages of the present invention will be apparent to those skilled in the art after a consideration of the following detailed description of the preferred construction, illustrated in the accompanying drawing forming a part of said specification.

In the drawing:

Figure 1 is a side view of a pitman connection embodying the principles of the present invention; and Figure 2 is a section taken along the line 3—3 of Figure 1.

The pitman is indicated in its entirety by the reference numeral 2 and includes a pitman bar 4 usually, but not necessarily, formed of wood and provided at one end with a centrally disposed generally longitudinally extending slot 5 in which connecting plates 6 are disposed. The connecting plates, as best shown in Figure 2, include sections 7 which are in engagement with each other and fit snugly within the slot 5. The slotted end portions 4a of the pitman bar 4 and the plate portions 7 are provided with aligned apertures to receive the rivets 8 by which the plates 6 are rigidly secured to the pitman bar 4. From Figure 2 it will be noted that the openings in the plates 6, which openings are indicated by the reference numeral 9, are slightly larger than the rivets, the difference being exaggerated in the drawing for purposes of explanation.

The plates 6 extend beyond the end of the pitman bar 4 and diverge outwardly, as at 10, and terminate in parallel laterally spaced or offset sections 11 that are disposed on opposite sides of a flange 13 formed integral with or carried by the hub 14 of a pitman bearing member indicated in its entirety by the reference numeral 15 and which includes a bushing 16 or the like. As best shown in Figure 1, each of the laterally spaced offset portions 11 is provided with a large central aperture 20 to receive the hub 14 of the bearing member 15, and the offset sections 11 are also provided with a peripheral series of openings registering with similar openings formed in the flange 13, and these sets of openings are adapted to receive securing bolts 21 by which the plates are rigidly fastened to the bearing member 15.

It will be apparent from Figure 2 that the offset sections 11 fit snugly against the sides of the flange 13 and, between the bearing member 15 and the adjacent end of the pitman bar 4, the divergent portions 10 incline toward one another and are in engagement at points lying in a plane which passes substantially midway through the flange 13 to which, it will be remembered, the offset plate sections 11 are rigidly secured by the bolts 21. By virtue of this construction, particularly by having portions 10, 10 of the plates, which are generally formed of steel or the like having some flexibility, spaced apart at the bearing member where they receive the driving forces, the two relatively thin connecting plates are in spite of their lateral flexibility capable of transmitting heavy compressive stresses without buckling or breaking. It sometimes happens, for example, that the crank pin is not properly alined with the pitman, in which case one of the plates 6 is continuously under an additional tension stress and the other is continuously under an additional compression stress. Inasmuch as the thrust being transmitted through the plates to reciprocate the pitman is almost of a hammering type, by virtue of the enlarged rivet holes 9 in the plates 6 there is a gradual creeping of one plate with respect to the other under the impacts to which they are subjected in operation. This relieves the aforesaid unbalanced tension and compression and is believed to be the main reason why the double plate has a much greater life than the single plate construction.

Under other conditions, as where the axis of the crank pin is not parallel to the axis of rotation of the crank wheel, the bearing member carried on the pin may oscillate or wobble laterally with respect to the pitman, causing both plates to flex, first in one direction and then in the other. As best shown in Figure 2, both plates are in contact just beyond the flange at the portions 10, 10 but they are not riveted or otherwise connected together at this point, hence there can be a certain amount of readjustment between the plates to accommodate such flexing. The plates, even though they can flex under load, remain in contact at the portions 10, 10 so that in any flexed position they act together with truss-like rigidity to transmit the driving force directly to the pitman bar 4 through the juxtaposed portions 6, 6 which are securely riveted in the centrally disposed slot 5. That is to say, if where a single plate is employed the plate is bent to accommodate a crank pin that is out of position, the transmission of a compressive force tends to cause the plate to buckle at the point of bend, but where two thin plates are employed with divergent portions 10, 10 the tendency for one plate to be deflected in one direction is offset by the tendency of the other plate to be deflected in the other direction. Thus, while two thin plates are more flexible than a single plate of the same total thickness, when a pair of thin plates are arranged as described above they are mutually reenforcing and the divergent or inclined sections 10 not only provide for the effective transmission of the sickle driving forces but they also serve to keep the plates from breaking.

If desired, the hub 14 of the bearing member 15 may be provided with a lubricant fitting 25 which communicates with a groove 26 acting to retain the lubricant and to direct it through openings 27 in the bushing 16.

While I have described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. A crank pin driven pitman comprising a bar having a slot therein, a pair of plate members having at one end apertured portions disposed within said slot, means disposed in and smaller than the apertures of said plate portions for retaining the same in position in said slot while providing for limited relative movement therebetween to accommodate a misalined crank pin, and a bearing member adapted to be carried by the crank pin and rigidly secured to the opposite end portions of said plate members.

2. A pitman comprising a bar having a centrally disposed longitudinally extending slot formed therein, a pair of sheet metal strap members appreciably wider than said bar and having at one end juxtaposed sections fitting within said slot, there being aligned apertures in said strap sections and the slotted end of said pitman bar, means disposed within said aligned apertures connecting said strap members to said pitman bar, a bearing member having a hub portion and a radially outwardly extending flange provided with openings formed therein, the end portions of said strap members opposite the juxtaposed sections thereof including offset sections spaced apart to receive said flange therebetween and each having a central opening to recive the hub of said bearing member and a plurality of openings registering with the openings in said flange, and means disposed in said openings for rigidly securing said bearing member to said strap members, the portions of said strap members between said flange and the pitman bar and joining said juxtaposed and spaced apart sections being inclined laterally of the pitman toward one another and arranged in mutual contact outwardly of the flange at points in the plane passing through the central portion of said flange.

3. A pitman comprising a bar having a centrally disposed longitudinally extending slot formed therein, a pair of sheet metal strap members having at one end juxtaposed sections fitting within said slot, there being aligned apertures in said strap sections and the slotted end of said pitman bar, the apertures in the bar being smaller than the apertures in said strap sections, means disposed within said aligned apertures connecting said strap members to said pitman bar and closely fitting the apertures in the bar and having clearance in the apertures of said strap sections, a bearing member having a hub portion and a radially outwardly extending flange provided with openings formed therein, the end portions of said strap members opposite the juxtaposed sections thereof including offset sections spaced apart to receive said flange therebetween and each having a central opening to receive the hub of said bearing member and a plurality of openings registering with the openings in said flange, and means disposed in said openings for rigidly securing said bearing member to said strap members, the portions of said strap members between said flange and the pitman bar and joining said juxtaposed and spaced apart sections being inclined laterally of the pitman toward one another and arranged in mutual contact outwardly of both the flange and the slotted end of the pitman bar at points in the plane passing through the central portion of said flange.

4. A crank pin driven pitman comprising a bar having a slot therein, flexible members having end portions disposed within said slot, means for retaining said members within said slot, said means providing for limited relative movement of said members within said slot, and a pitman bearing member adapted to be journaled on a crank pin and having a part secured to the other ends of said flexible members.

5. A crank pin driven pitman comprising a bar having a slot therein, members having end portions disposed within said slot with sufficient clearance in a longitudinal direction to accommodate a limited amount of longitudinal shifting movement of said members therein which tends to occur after extended use, means for retaining said members within said slot, said retaining means having sufficient clearance with respect to said members to accommodate longitudinal shifting movement of said members relative to each other and relative to said bar, and a pitman bearing member adapted to be journaled on a crank pin and rigidly secured to the other ends of said members.

6. A pitman comprising a bar having a slot formed therein, a pair of sheet metal strap members having juxtaposed sections at one end fitting within said slot, there being aligned apertures in said strap sections and the slotted end of said pitman bar, means disposed within said aligned apertures for rigidly connecting said strap members to said pitman bar, a bearing member having a hub portion and a radially outwardly extending flange provided with openings formed therein, the end portions of said strap members opposite the juxtaposed sections thereof being spaced apart to receive said flange therebetween and each having a central opening to receive the hub of said bearing member and a plurality of openings registering with the openings in said flange, and means disposed in said openings for rigidly securing said bearing member to said strap members.

7. A pitman comprising a bar having a slot formed therein, a pair of sheet metal strap members having at one end juxtaposed sections fitting within said slot, there being aligned apertures in said strap sections and the slotted end of said pitman bar, the apertures in the bar being smaller than the apertures in said strap sections, securing means disposed within said aligned apertures connecting said strap members to said pitman bar and closely fitting the apertures in the bar and having clearance in the apertures of said strap sections, a bearing member having a hub portion and a radially outwardly extending flange provided with openings formed therein, the end portions of said strap members opposite the juxtaposed sections thereof being spaced apart to receive said flange therebetween and each having a central opening to receive the hub of said bearing member and a plurality of openings registering with the openings in said flange, and means disposed in said openings for rigidly securing said bearing member to said strap members, the portions of said strap members between said flange and the pitman bar and joining said juxtaposed and spaced apart sections being arranged in mutual contact outwardly of both the flange and the slotted end of the pitman bar.

8. A pitman comprising a bar having a slot formed therein, a pair of sheet metal strap members having at one end juxtaposed sections fitting within said slot with sufficient clearance to accommodate a limited amount of shifting movement of said members therein, means for retaining said members within said slot, said retaining means having sufficient clearance with respect to said members to accommodate longitudinal shifting movement of said members relative to each other and relative to said bar, a bearing member, the end portions of said strap members opposite the juxtaposed sections thereof including sections mounted on said bearing member in spaced apart relation, and means for rigidly securing the spaced apart sections of said strap members to said bearing member.

9. A pitman comprising a bar having a slot in the end thereof, a pair of sheet metal strap members having juxtaposed end portions fitting within said slot, a bearing member having a hub portion and a radially outwardly extending flange, the opposite end portion of each of said strap members having an opening to receive said hub portion, there being aligned apertures in said juxtaposed end portions and said pitman bar and aligned openings in said opposite end portions and said hub flange, and means disposed in each of said aligned openings for securing the strap members to said pitman bar and said flange, certain of said openings having clearance with respect to the associated securing means to allow a limited relative displacement between said strap members to relieve stresses set up in said members due to a misalignment between said hub and said pitman bar.

10. A crank pin driven pitman comprising a pitman bar member, a bearing member having a hub, a pair of sheet metal straps secured adjacent one end to one of said members, there being aligned openings in the other ends of said pitman straps, and securing means extending through said openings for fastening said pitman straps to the other member, the openings in at least one of said straps having clearance with respect to the associated securing means to allow a limited relative displacement between said strap members to relieve stresses set up in said members due to a misalignment between said hub and said pitman bar.

LOUIS A. PARADISE.